(12) United States Patent
Schweizer et al.

(10) Patent No.: US 7,626,174 B2
(45) Date of Patent: Dec. 1, 2009

(54) X-RAY DETECTOR WITH CORRECTION FOR SCATTERED RADIATION

(75) Inventors: Bernd Schweizer, Herzogenrath (DE); Gereon Vogtmeier, Aachen (DE); Klaus Engel, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 402 days.

(21) Appl. No.: 11/570,900

(22) PCT Filed: Jun. 24, 2005

(86) PCT No.: PCT/IB2005/052091

§ 371 (c)(1),
(2), (4) Date: Dec. 19, 2006

(87) PCT Pub. No.: WO2006/000998

PCT Pub. Date: Jan. 5, 2006

(65) Prior Publication Data

US 2008/0272309 A1  Nov. 6, 2008

(30) Foreign Application Priority Data

Jun. 25, 2004  (EP) .................................. 04102954

(51) Int. Cl.
*H01L 27/146* (2006.01)
(52) U.S. Cl. .................... 250/370.09; 378/7; 378/87
(58) Field of Classification Search ................. 250/366, 250/367, 363.1, 370.09, 370.1, 370.08, 370.11, 250/370.14; 378/98.3, 98.8, 6, 7, 70, 86, 378/87, 98.4, 154, 156, 157, 158
See application file for complete search history.

(56) References Cited

U.S. PATENT DOCUMENTS

| | | | | | |
|---|---|---|---|---|---|
| 4,963,746 | A | * | 10/1990 | Morgan et al. | 250/363.02 |
| 5,138,167 | A | * | 8/1992 | Barnes | 250/370.01 |
| 5,263,075 | A | | 11/1993 | McGann et al. | |
| 5,550,378 | A | | 8/1996 | Skillicorn et al. | |
| 5,668,851 | A | | 9/1997 | Dobbs | |
| 6,285,740 | B1 | * | 9/2001 | Seely et al. | 378/98.9 |
| 6,408,049 | B1 | | 6/2002 | Edic et al. | |
| 6,470,072 | B1 | * | 10/2002 | Johnson | 378/154 |
| 6,744,852 | B2 | * | 6/2004 | Klotz et al. | 378/154 |
| 2002/0003863 | A1 | | 1/2002 | Ohkoda | |
| 2006/0072704 | A1 | * | 4/2006 | Tang et al. | 378/154 |

FOREIGN PATENT DOCUMENTS

EP  0 782 375 A1  7/1997
GB  2 375 170 A  11/2002

* cited by examiner

*Primary Examiner*—David P Porta
*Assistant Examiner*—David S Baker (57) ABSTRACT

The invention refers to X-ray devices, an X-ray detector and a method of correcting intensity signals. An X-ray detector then comprises for determining the intensity of X-rays, which comprise a proportion of primary radiation having an irradiation direction and a proportion of scattered radiation, at least a first sensor elements, which are each provided for converting the X-rays into first and second intensity signals, and a filter element, which is provided for decreasing the proportion of scattered radiation in the intensity of the X-rays, wherein the second sensor elements are arranged in irradiation direction behind the filter element and wherein the first sensor element fastened to the filter element is provided for determining the intensity of the X-rays before leaving the filter element. The proportion of the scattered radiation calculated from the measuring data of the first and second sensor elements is provided for correcting the second intensity signals for the following image generation.

20 Claims, 5 Drawing Sheets

X-RAY DETECTOR WITH CORRECTION FOR SCATTERED RADIATION

The invention relates to an X-ray detector, an X-ray device and a method of correcting intensity signals.

X-ray devices provide via image generation methods an image of an object that is irradiated by X-rays. Herein, the X-rays can be radiated by an X-ray source outside the object or, in the case of administering radioactive specimens respectively, from the object itself. The detected X-rays comprise primary radiation along an irradiation direction and scattered radiation. During the image generation, a high proportion of scattered radiation in the detected intensity of the X-rays would lead to image artifacts. In this respect, a minimization of the proportion of scattered radiation is an important factor for a qualitatively good image generation.

US 2002/0003863A1 document describes what is called an anti-scattered radiation grid (ASG) in irradiation direction before the X-ray detector to reduce the proportion of the scattered radiation in the X-ray intensity. Anti-scattered radiation grids do not eliminate the proportion of scattered radiation completely, however. Viewed in irradiation direction this may lead to the proportion of the scattered radiation exceeding the proportion of primary radiation, particularly behind areas with high X-ray absorption and thus a qualitatively good image generation is hampered.

It is an object of the invention to provide an X-ray detector, which enables a determination of the proportion of scattered radiation for a subsequent correction of the intensity data.

This object is achieved through an X-ray detector, an X-ray device and a method for the application in an X-ray device as follows.

The X-ray detector according to the invention is provided for determining the intensity of X-rays, which have a proportion of primary radiation in an irradiation direction and a proportion of scattered radiation, wherein the X-ray detector comprises a filter element provided for reducing the proportion of the scattered radiation in the intensity of the X-rays, at least a first sensor element fastened to the filter element and provided for converting the X-rays into first intensity signals before the X-rays leave the filter element, and second sensor elements arranged in the irradiation direction behind the filter element, for converting the X-rays into second intensity signals. In one embodiment with only a first sensor element, the object on which this invention is based (the determination of the proportion of the scattered radiation in the intensity of the X-rays) is achieved, in that a homogenous proportion of the scattered radiation is determined. In another embodiment with several first sensor elements, additionally the variations of the proportion of the scattered radiation are determined.

In another embodiment, a signal-conducting coupling of the first sensor element to a second sensor element is provided, which is arranged behind the first sensor element in extension of the irradiation direction. In this embodiment the coupled second sensor element is provided for a transfer of the first intensity signals of the first sensor element. This changes herein, the object of the second sensor element, but not its principal composition. If there are additional coupling coatings on the surface of the second element provided for coupling, which coatings hamper a transfer of the first intensity signals, only these are to be removed before a coupling. As far as this is concerned, all essential components of the X-ray detector in irradiation direction behind the filter element as against X-ray detectors without first sensor elements, can remain unchanged. From the point of view of manufacturing this offers the advantage that a multiplicity of manufacturing steps can be used in X-ray detector production without making changes for the X-ray detector claimed here. This particularly holds for the use of scintillators as a material for converting X-rays into visible light for an optical coupling via glass fiber material or other optical methods such as lens systems, since this type of coupling can be accomplished without rather large circuitry and cost and with negligible transmission losses.

In a further embodiment the first sensor element is reversibly fastened to the filter element and reversibly coupled to the second sensor element located behind it in extension of the irradiation direction. Through the possibility of varying place and number of the first sensor elements, the detector can be adapted to different basic conditions, for example, a generation of X-ray images in a sequence of alternately strongly and weakly scattering objects. In the case of strongly scattering objects with a large spatial variation of the proportion of scattered radiation, for capturing the local proportions of the scattered radiation, a larger number of first sensor elements is necessary than with objects with an essentially homogeneous proportion of scattered radiation. The second sensor elements are then provided either for the conversion of the X-rays into second intensity signals or, when coupled to first sensor elements, for transfer of the first intensity signals. These functions may change for a second sensor element in the case of a reversible coupling after removal/installation of a first sensor element.

For determining the proportion of the scattered radiation in the measured intensity of the X-rays, a difference in the proportion of the scattered radiation is necessary between first and second intensity signals. A first sensor element, which is fastened in the lower area of the filter element, generates first intensity signals with sufficiently large differences in the proportion of the scattered radiation compared to the second intensity signals. The larger the difference in the proportions of the scattered radiation between first and second intensity signals, the more accurately can the scattered ray distribution be determined for correction of the intensity data. Therefore, an arrangement of the first sensor elements with a conversion layer, whose surface viewed in irradiation direction is disposed in front of or on a level with the filter element, is advantageous. In this arrangement, the first intensity signal contains the proportion of scattered radiation not yet reduced by any filter element.

As is known, scattered radiation hits the filter element essentially without a preferred direction. The sensitivity of the first sensor element with regard to scattered radiation depends on the geometry of the surface of the conversion layer. A first sensor element with planar surface of the conversion layer is little sensitive to scattered rays with large angles of incidence, due to the smaller projected conversion layer surface for large angles of incidence. The term angle of incidence is defined here as the angle between irradiation direction of the primary radiation and the direction of propagation of the scattered radiation. An embodiment of the first sensor elements possesses a dome-shaped geometry of the conversion layer and evaluates scattered radiation from different directions very similarly. This geometry, suitable for the conversion of scattered radiation from arbitrary directions, therefore enables the measurement of first intensity signals with a high proportion of scattered radiation. Dome-shaped is to be understood to mean a curved surface here.

In a further embodiment, two first sensor elements can be used having in each element different geometries of the surfaces of the conversion layers, for the different evaluation of scattered rays with different angles of incidence. With this embodiment the proportion of the scattered radiation can additionally be determined as a function of the angle of incidence. If the proportion of the scattered radiation is known to be a function of the angles of incidence, a distinction can be made between scattered radiation with small angles of incidence, whose proportion is hardly changed by the filter element, and the primary radiation.

The invention also relates to an X-ray device with an X-ray detector as claimed in claim 1 and an image generation unit, wherein the image generation unit is provided for a correction of the second intensity signals while the first intensity signals are used.

The invention also relates to a method to be used in the image generation unit in an X-ray device as claimed in 9, comprising at least a first sensor element, which method comprises the following steps of:

- determining an interpolated intensity signal from the second intensity signals at a place behind the filter element, which filter element is located behind in extended irradiation direction the first sensor element,
- calculating the proportion of the scattered radiation at the place from the interpolated intensity signal, from the first intensity signal of the first sensor element located before it in irradiation direction and from reduction parameters of the filter element,
- determining the proportions of the scattered radiation behind the filter element for the second sensor elements from the proportions of the scattered radiation calculated in the preceding step,
- correcting the second intensity signals with the calculated proportions of the scattered radiation behind the filter element, and
- image generation based on the corrected second intensity signals.

The X-ray detector according to the invention and the method utilized for the correction of the intensity data enable an improved image generation particularly in areas of higher absorption by the object to be examined. The second intensity signals measured by the second sensor elements are therein basically for the later image generation. The first intensity signals are used for correcting the second intensity signals. The measured values for second intensity signals, which are missing at the places in extension of the irradiation direction viewed behind the first sensor elements, can be interpolated from the surrounding second intensity signals, provided that the relative proportion of first sensor elements of the total number of the sensor elements does not become too large. Estimations show that in case of strongly scattering objects, on the one hand, a relative proportion of first sensor elements of some percents is sufficient for determining the proportion of scattered rays and, on the other hand, second intensity signals below the filter element, needed for an image generation, can be interpolated without difficulty.

Generally, the proportion of the scattered radiation may also be determined by complex calibration measurements and simulation calculations. This leads, in principle, to images of similar quality, to the ones obtained with the above method. However, the necessary expenditure of time would be large. The invention used as a basis for application, enables an improved image generation, without an additional expenditure of time, noticeable to the user.

By the arrangement of the first sensor elements within the X-ray detector and the ensuing ensured spatial proximity between first and second sensor elements, the measuring data of first and second sensor elements correlate well with each other, so that a realistic scattered ray correction can be effected. This can be carried out, particularly with large-surface detectors with widths of a number of centimeters not by scattered ray sensors outside the X-ray detector, as in this case the distance between scattered ray sensor and pixel to be corrected (second sensor element) would lead to a faulty correction of data in the case of a typical spatial variation of the scattered radiation of a few centimeters. In this respect, the arrangement of the first sensor elements within the active area of the X-ray detector (volume given through sensor elements and filter element) enables a better image generation than possible alternative detectors with scattered radiation sensors outside the active X-ray detector area.

Examples of embodiment of the invention are further elucidated with reference to the Figures hereinafter. It shows in.

Figure 1:
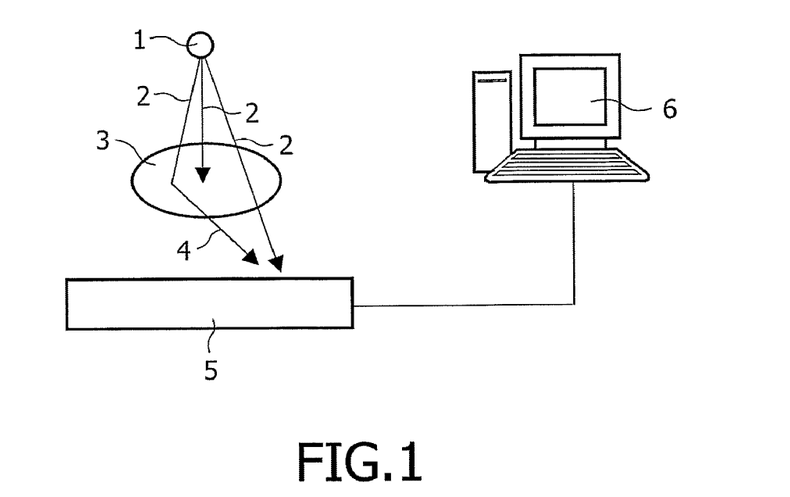
FIG. 1 a diagrammatic representation of an X-ray device.

FIG. 1 diagrammatically represents the essential components of an X-ray device. For the examination of an object 3 the X-ray device comprises an X-ray source 1, an X-ray detector 5 according to the invention and an image generation unit 6. The radiation 2 coming from the X-ray source 1 is incident on an object 3 in an irradiation direction and is either absorbed, scattered or penetrates the object along the original irradiation direction. A scattered ray 4 generally falls on the X-ray detector 5 along a direction of propagation different from the irradiation direction. As an angle of incidence of the scattered radiation is understood to mean the angle between direction of propagation of the scattered radiation and irradiation direction. Therefore, a differentiation is made between primary radiation (propagation along the irradiation direction) and scattered radiation. The same is also applicable to methods such as, for example, the Positron Emission Tomography (PET) or the Single Photon Emission Computer Tomography (SPECT). Here the X-ray is not produced with an x-ray source 1 outside the object, but in the object itself, after administering of radioactive specimens. Since here also the X-rays to be detected comprise proportions of primary radiation and scattered radiation, the invention underlying this application enables an image improvement with examination methods such as PET or SPECT also.

The intensity of the primary radiation is distinctly reduced with irradiation of an object. Simulations on a polyacryl water-filled cylinder having a diameter of 30 cm, show a rise in the relative proportion of the scattered radiation of the total intensity of 1% at the edge (largest primary ray intensity) of the object, up to 25% in the area of the lowest primary ray intensity. For other objects, the intensity of the primary radiation in irradiation direction, behind the object can even be smaller than the scattered radiation in areas of higher absorption due to local characteristics. In these areas, image artifacts for example shading or blooming can be observed. For a realistic image generation a sufficient scattered ray suppression is essential, be it hardware and/or software-related.

In order to reduce the intensity of the scattered radiation at the place of the X-ray detector, generally filter elements are placed in the irradiation direction before the X-ray detector. With this measure, the proportion of the scattered radiation of the intensity of the X-rays in irradiation direction viewed behind the filter element, is distinctly smaller than before the filter element. A conventional arrangement for the suppression of the scattered radiation represents an anti-scattered ray grid, according to document US2002/0003863A1, which grid comprises walls with a height of a few centimeters of an X-ray absorbing material, which walls are arranged parallel to the irradiation direction of the primary radiation. A location resolution of the order of magnitude of 1-2 mm² is enabled by structured sensor elements underneath the anti-scattered ray grid. Herein, the structuring can correspond to the course of the scattered ray grid. Anti-scattered ray grids having above dimensions still transmit about 5-15% of the original scattered radiation before the anti-scattered ray grid. For a realistic image generation, this is still too high for areas with lower primary ray intensity. An exact knowledge of the local proportion of the scattered radiation would enable a still further correction of the sensor signal. Hitherto, solely sensors outside the active detector area were used for a determination of the proportion of the scattered radiation of the intensity of the X-rays. This concept is applicable to detectors having a width below the modulation length of the scattered radiation of a few centimeters. With large-surface detectors having widths of, for example more than 10 cm, and large objects, the proportion of the scattered radiation can no longer be extrapolated with the necessary accuracy from measuring data of sensors outside the active detector area, since the spatial distance between scattered ray sensor and sensor element to be corrected is too large. Provided that the X-ray width (RB) is adapted to the detector width (DB), (for example: RB=a*DB, with a=0.55), there is a necessity for an exact scattered ray measurement particularly with large-surface detectors (large detector width) since, due to a larger X-ray volume, the large-surface detectors correspondingly receive more scattered radiation with the same primary ray energy relative to the primary radiation than detectors with smaller width, with which less scattered radiation is received because of the smaller X-rayed volume.

Figure 2:
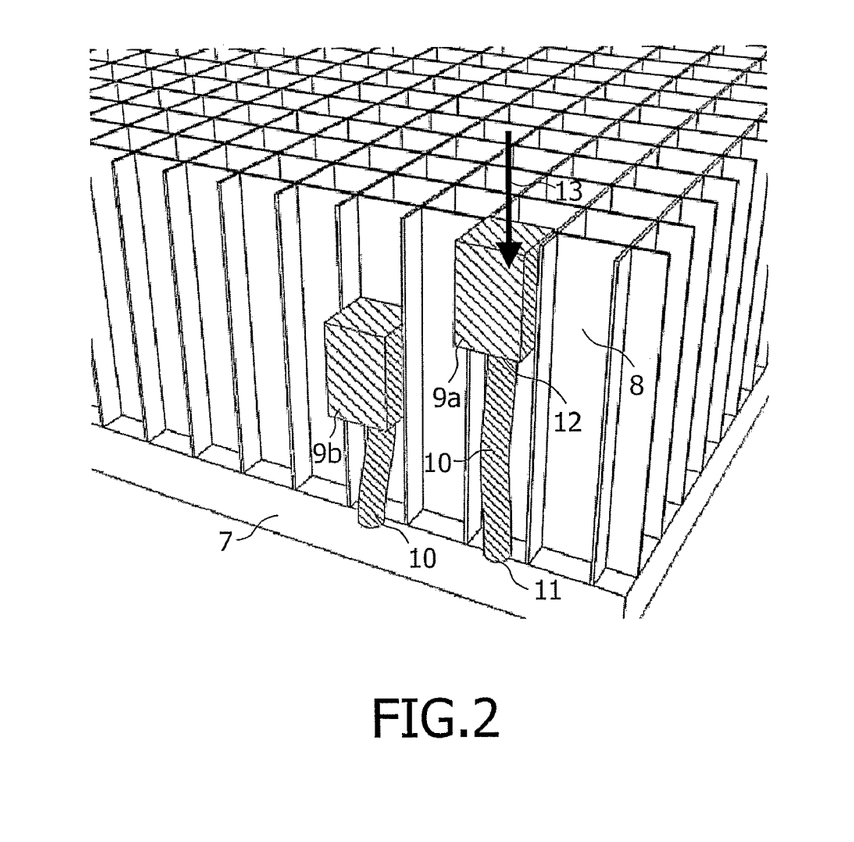
FIG. 2 the perspective lateral view of the X-ray detector with different positioning of first sensor elements, FIG. 3 the perspective lateral view of the X-ray detector with different embodiments of first sensor elements, FIG. 4 a diagrammatic sequence of the method for correcting the intensity signals, and FIGS. 5a to 5c presentations of results of the simulation calculations for different detector configurations.

FIG. 2 shows an X-ray detector according to the invention comprising a filter element 8 provided for reducing the proportion of the scattered radiation of the intensity of the X-rays, first sensor elements (9a, 9b) fastened to filter element 8 provided for the measurement of the intensity of the X-rays before leaving the filter element (first intensity signals) and second sensor elements 7 provided for the measurement of the intensity of the X-rays in irradiation direction 13 behind the filter element (second intensity signals). The arrangement of the filter element above second sensor elements may be different. Besides the arrangement shown in FIG. 2 with a filter element placed on the second sensor element, there are embodiments where there is a gap of particular width between filter element and second sensor elements. The invention underlying this application does not relate to a particular arrangement of the filter element relative to the second sensor elements and therefore includes both arrangements. In an example of embodiment of prior art the second sensor elements comprise a scintillator layer for conversion of X-rays into visible light and an image-sensitive detector for the conversion of the optical signals into electric signals. Herein, the local resolution besides the mandatorily available structuring of the photosensitive sensors can still be optimized with a corresponding additional structuring in the scintillator layer. Second sensor elements can be additionally equipped with functional coatings for reflection of the visible light in the direction of the photosensitive detectors. In another example of embodiment the second sensor elements comprise directly converting material (conversion of X-rays directly into electric signals, for example lead oxide, cadmium-zinc-tellurium), which is coupled to evaluation electronics in a structure suitable for locally resolved measurements.

The position of the first sensor element in the X-ray detector according to the invention is to be selected in such a way that the measurement of the X-rays is effected before their emergence from the filter element. A measurement of the X-rays before emergence from the filter element here means that the entire volume of the conversion layer with a thickness D of the first sensor element should be within the filter element. With intensity measurements before leaving the filter element (first intensity signals) and after the filter element (second intensity signals), intensity data of the X-rays are obtained, which differ in their proportion of the scattered radiation, whereas the proproportion of primary radiation is the same if shading effects from the filter elements are disregarded. From the data records of the first and second intensity signals, the scattered ray distribution can be calculated with a method explained in the following text and can be used for the correction of the second intensity signals. The implementation of this method solely assumes a sufficiently large difference in the scattered ray proportion between first and second intensity signals. This assumption is fulfilled both by an arrangement 9b of the second sensor elements within the filter element and by arrangement 9a on the surface of the filter element. With the arrangement 9a, the proportion of the scattered radiation is particularly large, because the scattered ray reducing effect of the filter element has not yet begun here and can thus be evaluated well.

For fastening the first sensor element, preferably the filter element is provided. The first sensor element can then be stuck into the filter element, fixed by adhesive layers to the walls of the filter element or be fastened to the filter element by a mechanical clamping device. For the X-ray detector and the further correction method according to the invention, a provision of second sensor elements in extension of the irradiation direction below the first sensor elements is not necessary. The first intensity signals can be transmitted directly to the photoelectrode for conversion into electric signals. FIG. 2 shows an embodiment with coupling 10 to a second sensor element below the first sensor element and in extension of the irradiation direction. In this embodiment, the coupled second sensor element is provided for a transfer of the first intensity signals of the first sensor element. A conversion of the X-rays into intensity signals is not effected by coupled second sensor elements. In an embodiment with reversible mechanical, chemical or another type of fastening, a formerly coupled second sensor element again takes over the function of converting the X-rays into second intensity signals after the first sensor element arranged over it has been removed.

The coupling of the first sensor element to the second sensor element can be executed in different ways. For example, the filter element can be filled with a signal-conducting material at the places provided for the first sensor elements. This material could be introduced in the filter element during manufacture of the filter element or at a later point of time. The coupling material could be conversion material. An example of embodiment for as loss-free a signal transfer as possible between the first and the second sensor element is a coupling 10 via glass fiber material. Possible signal losses at the interfaces 11 and 12 between glass fiber material and first and second sensor elements can be minimized by the use of adhesives or oils with suitable refractive indices.

Second sensor elements, which have scintillator material as a conversion layer, can be equipped with layers for the reflection of the optical radiation in the direction of the photodiodes (for example, on the surface of the conversion layer, which is facing the irradiation direction of the X-rays). These layers transmit the original X-rays and reflect the converted radiation into the desired direction (to the photodiode). Such layers prevent a transmission of the first intensity signal to the photodiodes and must, therefore, be removed before the coupling of the first sensor elements or already be avoided during the manufacture of the X-ray detector. This can be implemented for example in the production process of the detector by suitable coating print methods, in which the second sensor elements provided for coupling to first sensor elements are omitted, or by coatings with appropriate masks. Alternatively, a subsequent removal of such a coating on second sensor elements by means of mechanical or chemical solution methods is possible, since the filter element is preferably added only after manufacture of the sensor elements and, therefore, the second sensor element surface facing the later irradiation direction, is freely accessible for a possible modification.

Figure 3:
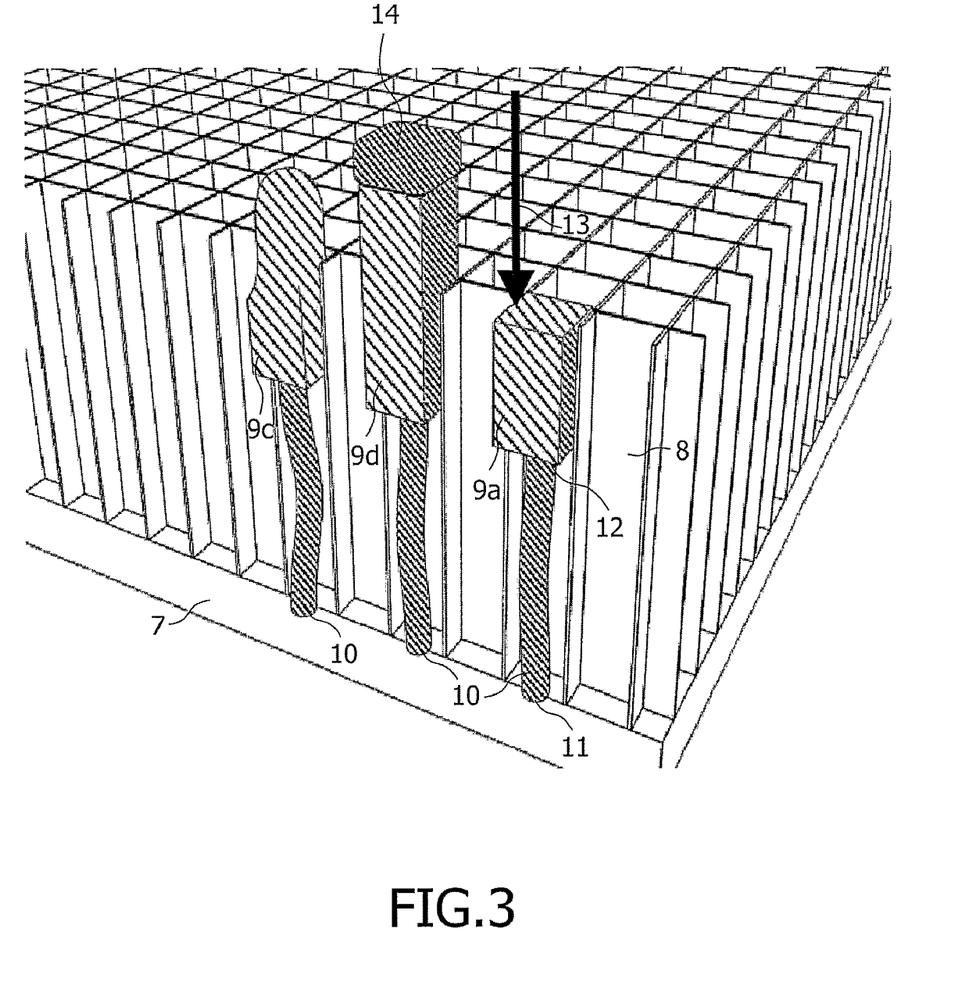

FIG. 3 shows first sensor elements (9a, 9c, 9d) with at least one conversion layer with a surface in the irradiation direction before or on a level with the filter element, which differ in the geometrical embodiment of this surface. With these embodiments, the strongly varying angle of incidence of the scattered radiation can be additionally considered. A first sensor element 9a with a planar detector surface is particularly sensitive to scattered radiation with small angles of incidence, due to the correspondingly large projected surface of the conversion layer for these small angles. A first sensor element 9c with a dome-shaped surface is equally sensitive to scattered radiation with large and small angles of incidence. Dome-shaped is here understood to mean a surface curved evenly in the third space dimension. A first sensor element 9d can be additionally equipped with an X-ray-absorbing layer 14. With sensor element 9d, the proportion of primary radiation of the intensity of the X-rays is suppressed, while the scattered rays with large angles of incidence are mainly detected. An arrangement of first sensor elements with different geometries of the surfaces would allow an angle-dependent determination of the scattered ray distribution. With knowledge of the angle distribution of the scattered radiation, a distinction between primary radiation and scattered radiation with small angles of incidence and thus an additional correction of the scattered radiation would be possible. Hitherto, the proportion of the scattered radiation with small angles of incidence could not be reduced by the filter element and/or corrected mathematically.

Figure 4:
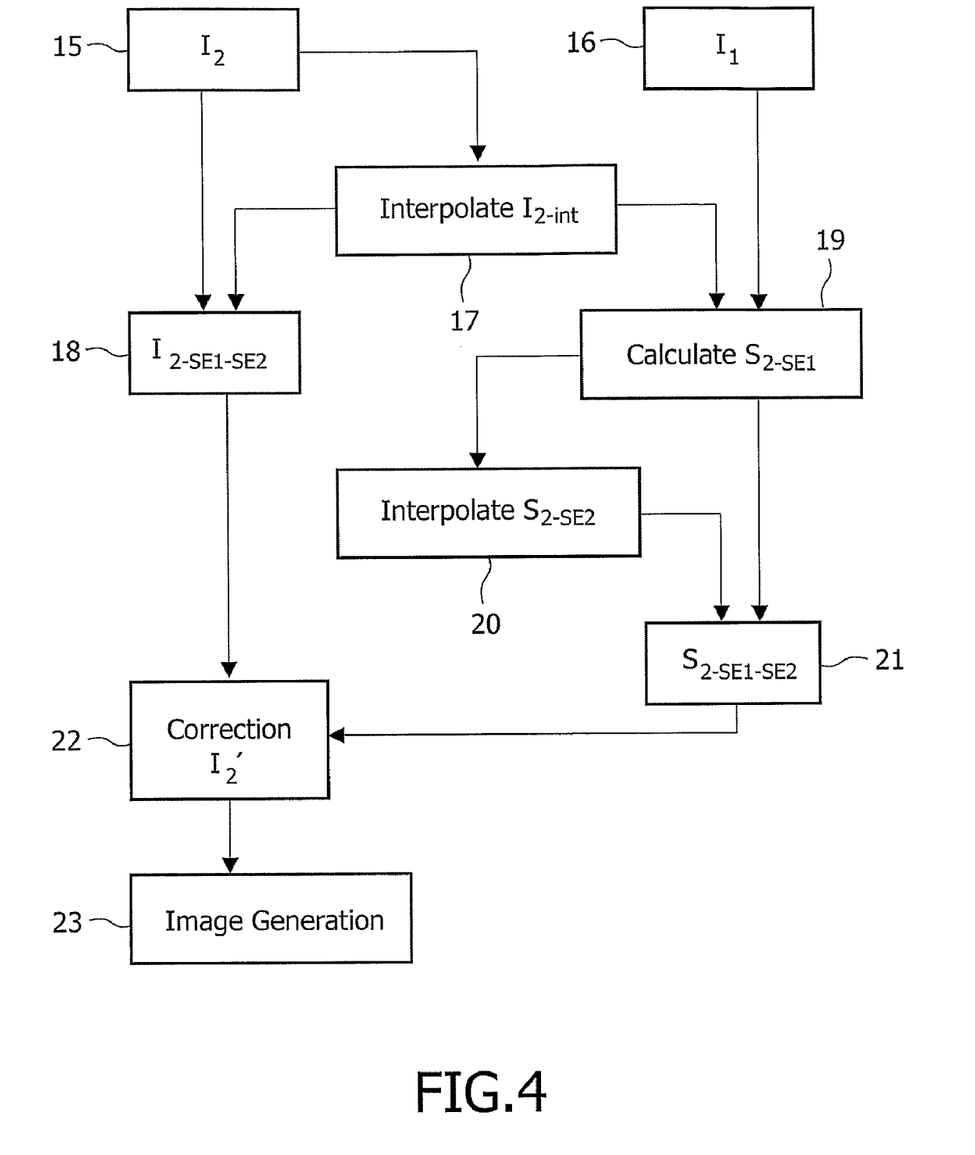

The method, which is provided for the correction of the measured intensity data, is represented in FIG. 4. It uses the measured values of the first intensity signals $I_1$ of the first sensor elements and of the second intensity signal $I_2$ of the second sensor elements as input values. $I_{2\text{-}int}$ denotes the intensity signals interpolated from the second intensity signals at the places behind the filter element in extension of the irradiation direction, below the first sensor elements. $S_{2\text{-}SE1}$ denotes the calculated proportions of the scattered radiation at the places behind the filter element in extension of the irradiation direction below the first sensor elements. Furthermore, $S_{2\text{-}SE2}$ denotes the proproportion of the scattered radiation of the second sensor elements behind the filter element. The complete data matrices of the second intensity signals and proportions of the scattered radiation for all places behind the filter element are denoted $I_{2\text{-}SE1\text{-}SE2}$ and $S_{2\text{-}SE1\text{-}SE2}$. The corrected intensity signals behind the filter element for the following image generation are denoted $I_2'$. For every second sensor element q there is an intensity $I_q=\alpha_q*P_q+\beta_q*S_q$, where $P_q$ and $S_q$ denote the proportions of the unfiltered primary and scattered radiation and $\alpha$ and $\beta$ are reduction parameters, which are dependant on place and geometry of the filter element. The filter element is then provided for a minimization of $\beta$. Incident X-rays would have an X-ray intensity I with $I_q \propto P_q$, after emission from an ideal filter element having reduction parameter $\beta_q=0$. With a real filter element, $\beta_q>0$.

For determining the reduction parameters for a later signal correction, a unique calibration procedure is provided via intensity measurements of the X-rays on test objects with and without a filter element. In the arrangement according to the invention of the first and second sensor elements of the X-ray detector, q second sensor elements are provided for measuring the second intensity signals for the image generation and m first sensor elements for measuring the first intensity signals for the correction of the second intensity data, where n=m+q with q>m. After measurement of m first intensity signals $I_1$ before emission from the filter element (rectangle 16) and q second intensity signals $I_2$ behind the filter element (rectangle 15), the intensity $I_{2\text{-}int}$ at the place behind the filter element in extended irradiation direction behind the first sensor element (rectangle 17) is interpolated from the data for $I_2$. A direct measurement of $I_{2\text{-}int}$ is not possible, since the first sensor element already converts the X-rays before leaving the filter element. If there is a second sensor element in extension of the irradiation directions below the first sensor element, then it is provided merely for a transfer of the first intensity signals. The data matrix $I_{2\text{-}SE1\text{-}SE2}$ of the second intensity signals behind the filter element now comprises n values for all n sensor elements/places behind the filter element (rectangle 18), comprising q measured second intensity signals and m interpolated intensity signals. The proportion of the scattered radiation $S_{2\text{-}SE2}$ in extension of the irradiation direction behind the filter element can now be calculated (rectangle 19) for all m first sensor elements, for example, by solving the unambiguous system of equations after the steps (rectangle 16) and (rectangle 17)

$$I_1=P_{1\text{-}SE1}+S_{1\text{-}SE1} \qquad (a)$$

$$I_{2\text{-}int}=\alpha*P_{1\text{-}SE1}+\beta*S_{1\text{-}SE1}=P_{2\text{-}SE1}+S_{2\text{-}SE1} \qquad (b)$$

with $P_{2\text{-}SE1}=\alpha*P_{1\text{-}SE1}$ and $S_{2\text{-}SE1}=\beta*S_{1\text{-}SE1}$ with the known reduction parameters $\alpha$ and $\beta$. The proportion of the scattered radiation $S_{2\text{-}SE2}$ in the second intensity signals for all q second sensor elements is determined by means of interpolation and/or extrapolation from the m calculated values $S_{2\text{-}SE1}$ for all m places (rectangle 20) behind the filter element in extension of the irradiation direction behind the first sensor elements. For the special case m=1, determining the proportion of the scattered radiation $S_{2\text{-}SE2}$ is understood to mean the transfer of the constants of $S_{2\text{-}SE1}$ for all remaining q values of the data matrix $S_{2\text{-}SE1\text{-}SE1}$. The data matrix $S_{2\text{-}SE1\text{-}SE2}$ for the proportion of the scattered radiation now comprises n values for all n sensor elements (rectangle 21), which are all identical in the special case m=1. The correction (rectangle 22) of the second intensity signals behind the filter element for image calculation comprises subtraction of the n values of the data matrix $S_{2\text{-}SE1\text{-}SE2}$ (rectangle 21) from the corresponding n values of the data matrix $I_{2\text{-}SE1\text{-}SE2}$ (rectangle 18). The image is then generated (rectangle 23) with the corrected n intensity data $I_2'$.

An alternative method of determining the proportions of the scattered radiation (rectangle 19) in the intensity of the X-rays behind the filter element is an iterative calculation, with which the proportion of the scattered radiation behind the filter element is set to zero as an initial value and the corresponding proportion of the scattered radiation is calculated by means of iterative interpolation and correction of the first and second intensity data. If this iterative method is implemented until a suitable abort criterion is reached, an equivalent result can be obtained. The disadvantage with this alternative calculation is the higher calculation effort.

Figure 5A:
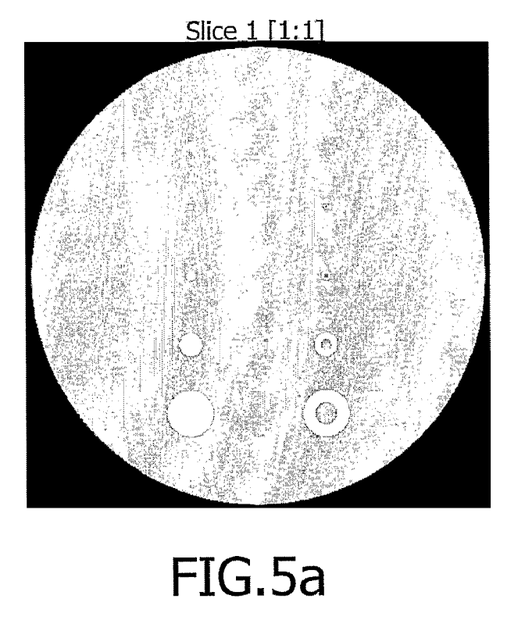
Figure 5B:
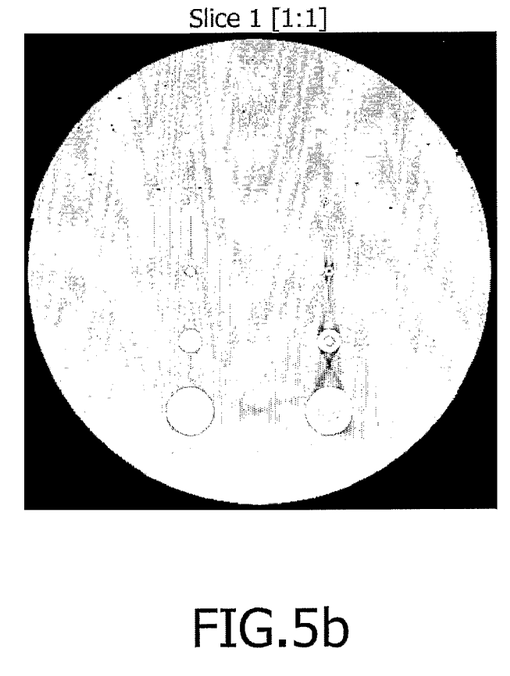
Figure 5C:
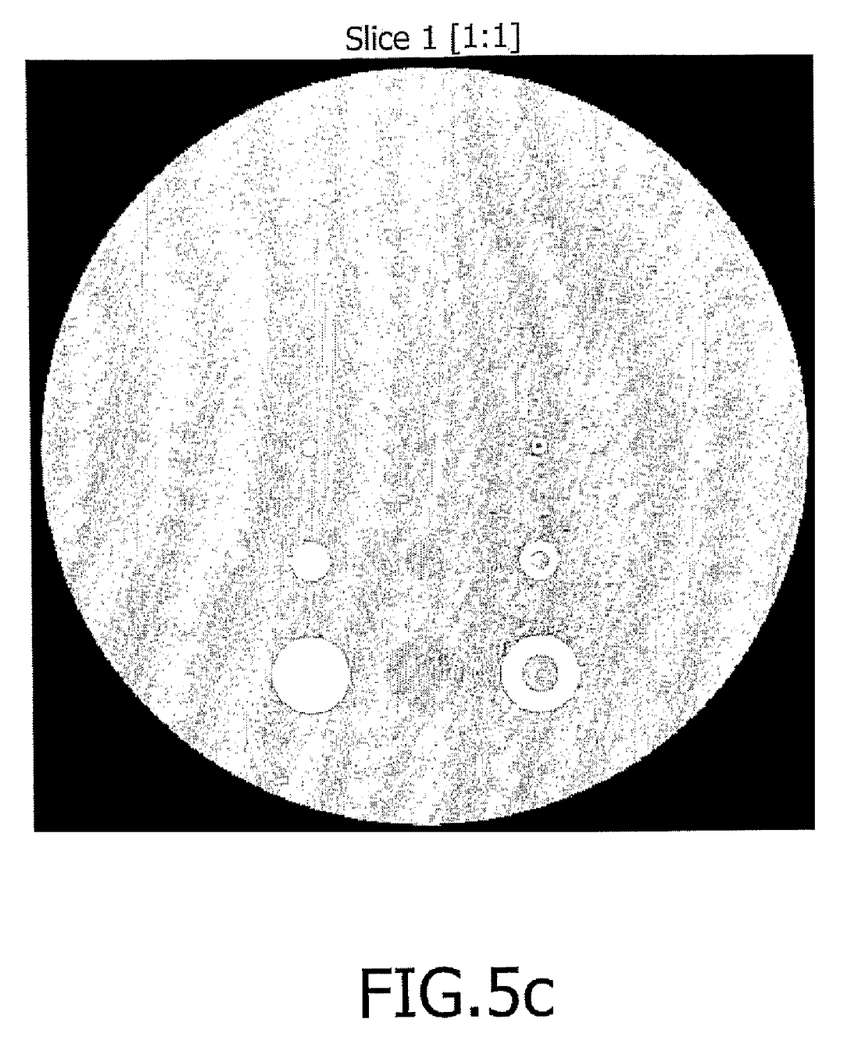

FIGS. 5a, 5b and 5c show on the basis of simulation calculations with respect to a water cylinder 20 cm in length and 40 cm in diameter, in which cylindrical substructures with different diameters and different absorption behavior are additionally arranged, that a clear image improvement can be achieved by a correction of the intensity data according to the invention. The X-ray detector comprises a matrix of 64×672 second sensor elements. The degree of the X-ray absorption is therein represented by different gray tones. FIG. 5a shows the image of the above cylinder by means of an ideal detector without a scattered ray proportion. FIG. 5b shows the image generation on the basis of second intensity signals of this X-ray detector with a filter element with the reduction parameters α and β, wherein β=0.1 (corresponds to a filter element of 30 mm thickness). Without the invented correction of the intensity signals, image artifacts are clearly visible as "casting of a shadow" of the substructures for this arrangement. For FIG. 5c were used identical intensities of the primary radiation and proportion of the scattered radiation above the filter element, as well as attenuation parameters as shown in FIG. 5b. Additionally, for this simulation in extension of the irradiation direction before 0.4% of the second sensor elements, first sensor elements were arranged for the measurement of first intensity signals and the method according to the invention of correcting the second intensity signals was executed. The image artifacts visible in FIG. 5b are no longer shown in FIG. 5c, which demonstrates the effectiveness of the method according to the invention.

The invention claimed is:

1. An X-ray detector for determining intensity of X-rays, which have a proportion of primary radiation having an irradiation direction and a proportion of scattered radiation, the X-ray detector comprising
a filter element provided for reducing the proportion of the scattered radiation in the intensity of the X-ray,
at least a first sensor element fastened to the filter element, for converting the X-rays into first intensity signals before emergence of the X-ray from the filter element, and
second sensor elements provided for the conversion of the X-rays into second intensity signals and arranged in irradiation direction behind the filter element, wherein the first sensor element provides a signal-conducting coupling to at least one of the second sensor elements located behind the first sensor element in extension of the irradiation direction and wherein the at least one of the second sensor elements provides for transmitting the first intensity signals.

2. An X-ray detector as claimed in claim 1, wherein glass fiber material or a lens system is provided for the signal-conducting coupling.

3. An X-ray detector as claimed in claim 1, wherein the first sensor element is reversibly fastened on the filter element and reversibly coupled to the second sensor element in a signal-conducting way, which is located behind it in extension of the irradiation direction.

4. An X-ray detector as claimed in claim 1, wherein the first sensor element has a conversion layer whose surface, viewed in irradiation direction, is located before or on a level with the filter element.

5. An X-ray detector as claimed in claim 4, wherein the surface of the conversion layer has dome-shaped geometry.

6. An X-ray detector as claimed in claim 4, wherein there are two first sensor elements whose surfaces case differ by different geometry.

7. An X-ray device comprising an X-ray detector as claimed in claim 1, further comprising an image generation unit that corrects the second intensity signals using the first intensity signals.

8. A method of correcting measured intensity data of an X-ray, comprising:
employing a processor executing computer-executable instructions stored on a computer readable medium to implement the following acts:
determining a first intensity signal of the X-ray at a location before emergence from a filter element, wherein the first intensity signal is measured by at least two first sensor elements having surfaces of disparate geometry;
determining an interpolated intensity signal from a second intensity signal, wherein the second intensity signal is calculated from a second sensor element in an irradiation direction at a place behind the filter element;
calculating a proportion of scattered radiation from the interpolated intensity signal, from at least one of the first intensity signal or reduction parameters of the filter element;
determining a proportion of the scattered radiation at a location behind the filter element based at least in part upon a subset of the calculated proportions; and
correcting the second intensity signal with the calculated proportions of the scattered radiation behind the filter element.

9. The method of claim 8, further comprising generating an image based upon the corrected second intensity signal.

10. The method of claim 8, further comprising transmitting the first intensity signal between at least one of the first sensor elements and the second sensor element via a signal-conducting coupling.

11. The method of claim 8, wherein at least one of the surfaces is positioned substantially on level with the filter element.

12. A system that facilitates determination of X-ray intensity, comprising:
a first sensor element that converts an X-ray into a first intensity signal, wherein the conversion occurs prior to exiting a filter element;
a second sensor element that converts an X-ray into a second intensity signal, wherein the second sensor is positioned in an irradiation direction behind the filter element and is operationally conductive with the first sensor element; and
means for calculating a proportion of scattered radiation based at least in part upon the first intensity signal and the second intensity signal, wherein the proportion of scattered radiation enables image generation.

13. The system of claim 12, wherein the first sensor element is reversibly fastened to the filter element and reversibly coupled to the second sensor element located behind the first sensor element in extension of the irradiation direction.

14. The system of claim 12, further comprising the filter element that controls scatter of radiation.

15. The system of claim 12, wherein the first sensor comprises a planar-shaped geometry.

16. The system of claim 12, wherein the first sensor comprises a dome-shaped geometry.

17. The system of claim 12, further comprising an image generation unit that facilitates establishment of an image that represents the X-ray.

18. The system of claim 12, wherein at least one of glass fiber or a lens system facilitates the operationally conductive feature.

19. The system of claim 12, wherein the detection by the first sensor element occurs above the filter element.

20. The system of claim 12, wherein the detection by the second sensor element occurs below the filter element.

* * * * *